(12) United States Patent
DeMonte et al.

(10) Patent No.: US 10,932,420 B2
(45) Date of Patent: Mar. 2, 2021

(54) GREENHOUSE LATENT MOISTURE AND HEAT EXCHANGER

(71) Applicant: Therma-Stor LLC, Madison, WI (US)

(72) Inventors: Todd R. DeMonte, Cottage Grove, WI (US); Sean Michael Ebert, Pewaukee, WI (US); Weizhong Yu, Cottage Grove, WI (US)

(73) Assignee: Therma-Stor, LLC, Madison, WI (US)

( * ) Notice: Subject to any disclaimer, the term of this patent is extended or adjusted under 35 U.S.C. 154(b) by 74 days.

(21) Appl. No.: 15/957,521

(22) Filed: Apr. 19, 2018

(65) Prior Publication Data

US 2019/0320594 A1 Oct. 24, 2019

(51) Int. Cl.
*A01G 9/24* (2006.01)
*F28D 21/00* (2006.01)
*A01G 9/18* (2006.01)
*B01D 53/22* (2006.01)

(52) U.S. Cl.
CPC ............. *A01G 9/246* (2013.01); *A01G 9/18* (2013.01); *B01D 53/22* (2013.01); *F28D 21/0015* (2013.01); *B01D 2257/80* (2013.01)

(58) Field of Classification Search
CPC .. B01D 53/22; B01D 53/228; B01D 2257/80; A01G 9/18; A01G 9/246; F28D 21/0015
See application file for complete search history.

(56) References Cited

U.S. PATENT DOCUMENTS

| | | | | |
|---|---|---|---|---|
| 4,125,963 A | * | 11/1978 | Johnson | A01G 9/247 47/21.1 |
| 2005/0188844 A1 | * | 9/2005 | Matsumura | F28D 21/0015 96/4 |

(Continued)

FOREIGN PATENT DOCUMENTS

| CA | 2956046 A1 | 2/2016 |
|---|---|---|
| WO | 2011049440 A1 | 4/2011 |

(Continued)

OTHER PUBLICATIONS

Canadian Intellectual Property Office, Canadian Office Action, Application No. 3,034,280, dated May 1, 2019, 4 pages.

(Continued)

*Primary Examiner* — Jason M Greene
(74) *Attorney, Agent, or Firm* — Baker Botts L.L.P.

(57) ABSTRACT

A system includes a latent exchanger and first and second fans. The latent exchanger includes first and second chambers and one or more membranes separating the first chamber from the second chamber. The one or more membranes are gas-impervious. The first fan generates a greenhouse airflow that flows from a greenhouse, into the first chamber, and then back to the greenhouse. The second fan generates an outside airflow that flows from an outside environment, into the second chamber, and then back to the outside environment. The one or more membranes are configured to permit moisture to flow through the one or more membranes from the greenhouse airflow to the outside airflow through the one or more membranes and to prevent carbon dioxide from flowing through the one or more membranes from the greenhouse airflow to the outside airflow.

14 Claims, 4 Drawing Sheets

(56) References Cited

U.S. PATENT DOCUMENTS

| | | | | |
|---|---|---|---|---|
| 2005/0236136 A1* | 10/2005 | Veltkamp | .............. | F24F 12/001 165/4 |
| 2006/0123699 A1* | 6/2006 | Lo Presti | ................ | A01G 9/246 47/17 |
| 2008/0087165 A1* | 4/2008 | Wright | ..................... | A01G 9/18 95/51 |
| 2012/0061045 A1* | 3/2012 | Huizing | ............... | B01D 53/268 165/10 |
| 2012/0260689 A1* | 10/2012 | Veltkamp | ............... | A01G 9/246 62/238.7 |
| 2018/0363929 A1* | 12/2018 | Mullen | ............... | F28D 21/0015 |

FOREIGN PATENT DOCUMENTS

| | | | |
|---|---|---|---|
| WO | 2017100947 A1 | 6/2017 | |
| WO | 2017192038 A1 | 11/2017 | |

OTHER PUBLICATIONS

Canadian Intellectual Property Office, Canadian Office Action, Application No. 3,034,280, dated Jul. 10, 2019, 5 pages.
Canadian Patent Office, Canadian Office Action, Application No. 3,034,280, dated Dec. 11, 2019, 5 pages.
Canadian Intellectual Property Office, Canadian Office Action, Application No. 3,034,280, dated Jul. 29, 2020, 8 pages.
Canadian Intellectual Patent Office, Canadian Office Action, Application No. 3,034,280, dated Dec. 18, 2020, 9 pages.

* cited by examiner

GREENHOUSE LATENT MOISTURE AND HEAT EXCHANGER

TECHNICAL FIELD

This invention relates generally to greenhouses and more particularly to a greenhouse latent moisture and heat exchanger.

BACKGROUND OF THE INVENTION

Greenhouses are utilized in many geographical locations to grow crops and plants year-round and in climates that may not otherwise provide hospitable growing conditions. Greenhouses typically consist of structures that enable environmental conditions inside the structure to be regulated and controlled. For example, it may be desirable to have higher carbon dioxide ($CO_2$) levels within a greenhouse to increase yield. On the other hand, most greenhouses need to control excess moisture within the greenhouse by ventilating air to the outside environment using one or more exhaust fans. Maintaining high carbon dioxide levels within a greenhouse while ventilating excess moisture to the outside environment is challenging, cost-prohibitive, or otherwise infeasible with existing greenhouse systems.

SUMMARY OF THE INVENTION

According to embodiments of the present disclosure, disadvantages and problems associated with previous greenhouse systems may be reduced or eliminated.

In some embodiments, a system includes a latent exchanger and first and second fans. The latent exchanger includes first and second chambers and a membrane (or multiple membranes arranged in a core) separating the first chamber from the second chamber. The membrane is gas-impervious. The first fan generates a greenhouse airflow that flows from a greenhouse, into the first chamber, and then back to the greenhouse. The second fan generates an outside airflow that flows from an outside environment, into the second chamber, and then back to the outside environment. The membrane is configured to permit moisture to flow through the membrane from the greenhouse airflow (with its higher vapor pressure) to the outside airflow (with its lower vapor pressure) through the membrane and to prevent carbon dioxide from flowing through the membrane from the greenhouse airflow to the outside airflow.

Certain embodiments of the present disclosure may provide one or more technical advantages. Some embodiments provide a latent exchange system that may be used by greenhouses or other sealed enclosures to transfer heat and moisture to the outside environment without ventilating valuable carbon dioxide to the outside environment. To accomplish this, some embodiments of the latent exchange system include two separate chambers that are separated by a membrane. The membrane permits moisture and heat to pass through the membrane, but is fully or semi impervious to carbon dioxide and other gasses. As inside air (e.g., from a greenhouse) flows through one chamber while outside air flows through the second chamber, the membrane permits moisture and heat to be transferred from the inside air to the outside air while preventing gasses such as carbon dioxide from escaping into the outside air. This allows spaces such as greenhouses to remain sealed in order to maintain high levels of carbon dioxide while still permitting heat and moisture to be evacuated to the outside environment, thereby saving energy and increasing yield.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Greenhouses are utilized in many geographical locations to grow crops and plants year-round and in climates that may not otherwise provide hospitable growing conditions. Greenhouses typically consist of structures that enable environmental conditions inside the structure to be regulated and controlled. For example, it is usually desirable to have higher carbon dioxide ($CO_2$) levels within a greenhouse to increase yield. On the other hand, most greenhouses need to control excess moisture within the greenhouse by ventilating air to the outside environment. Maintaining high carbon dioxide levels within a greenhouse while ventilating excess moisture to the outside environment is challenging, cost-prohibitive, or otherwise infeasible with existing greenhouse systems.

To address these and other problems and inefficiencies of existing greenhouse systems, the disclosed embodiments provide a latent exchange system that may be used by greenhouses or other sealed enclosures to transfer heat and moisture to the outside environment without ventilating valuable carbon dioxide to the outside environment. To accomplish this, some embodiments of the latent exchange system include two separate chambers that are separated by a membrane (or multiple membranes). The membrane permits moisture and heat to pass through the membrane, but is impermeable to carbon dioxide and other gasses. As inside air (e.g., from a greenhouse) flows through one chamber while outside air flows through the second chamber, the membrane permits moisture and heat to be transferred from the inside air into the outside air while preventing gasses such as carbon dioxide from escaping into the outside air. This allows spaces such as greenhouses to remain sealed in order to maintain high levels of carbon dioxide while still permitting heat and moisture to be evacuated to the outside environment, thereby saving energy and increasing yield.

Figure 1:
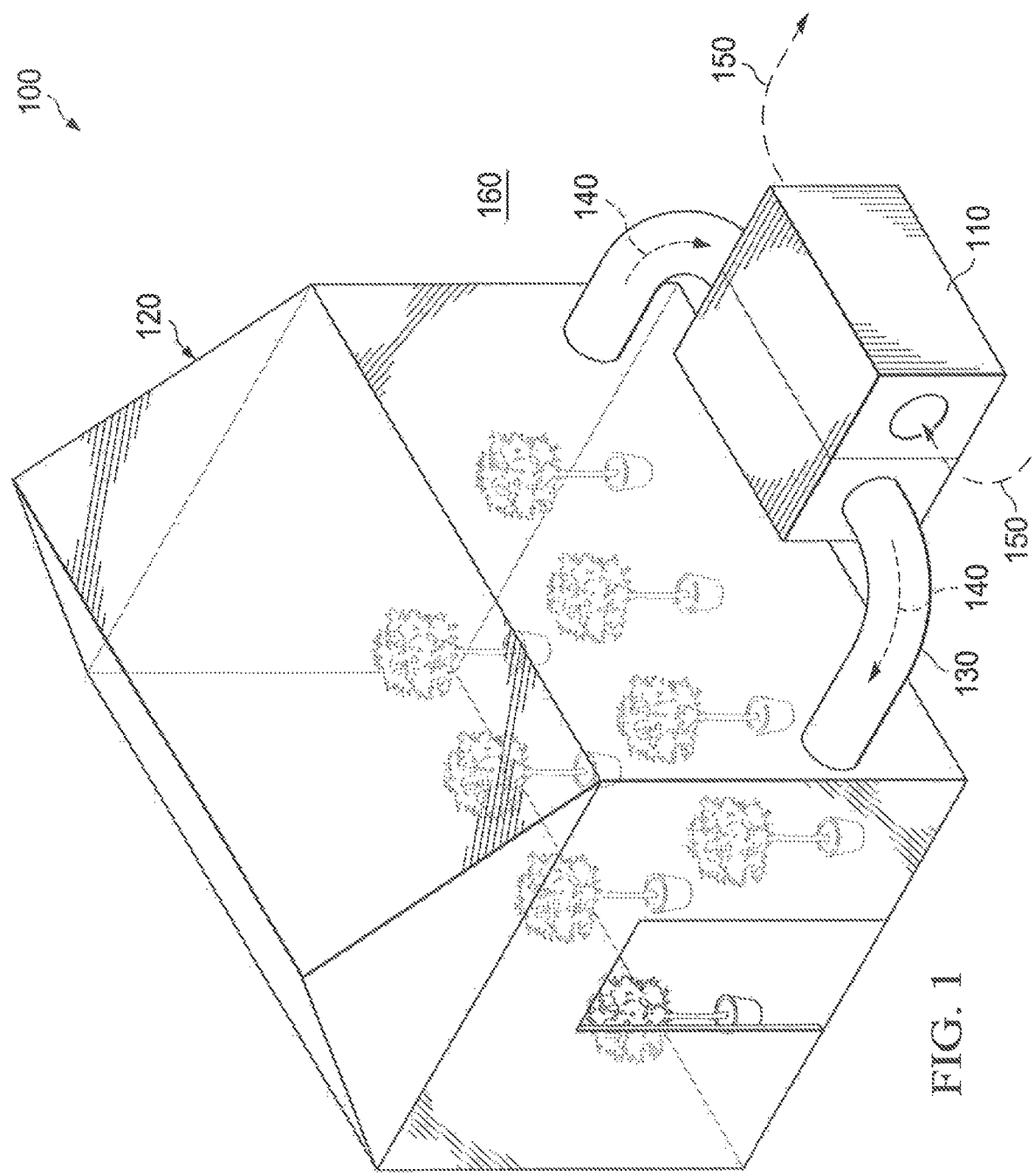
FIG. 1 illustrates a greenhouse system, according to certain embodiments.
Figure 2:
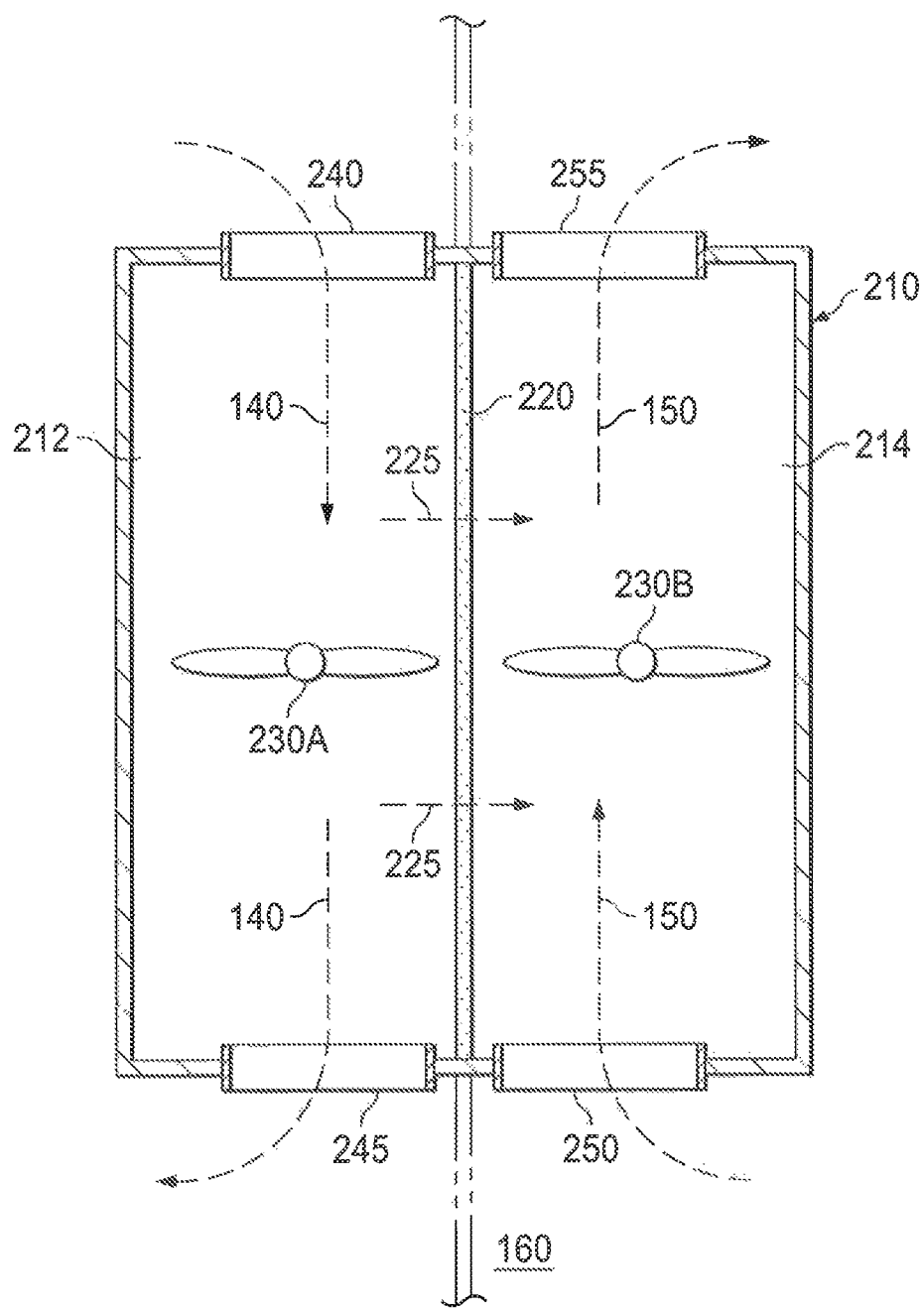
FIG. 2 illustrates a latent exchanger that may be utilized by the greenhouse system of FIG. 1, according to certain embodiments.
Figure 3:
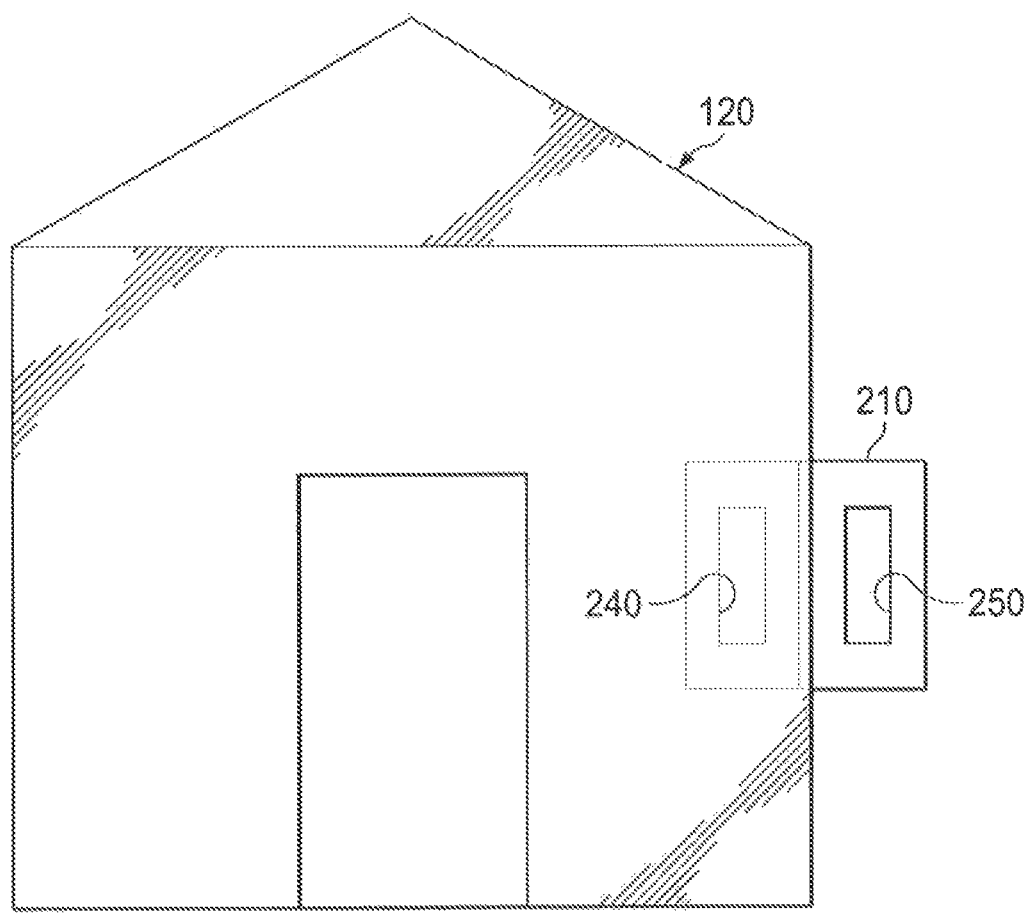
FIG. 3 illustrates an alternate installation of the latent exchanger of FIG. 2, according to certain embodiments.
Figure 4:
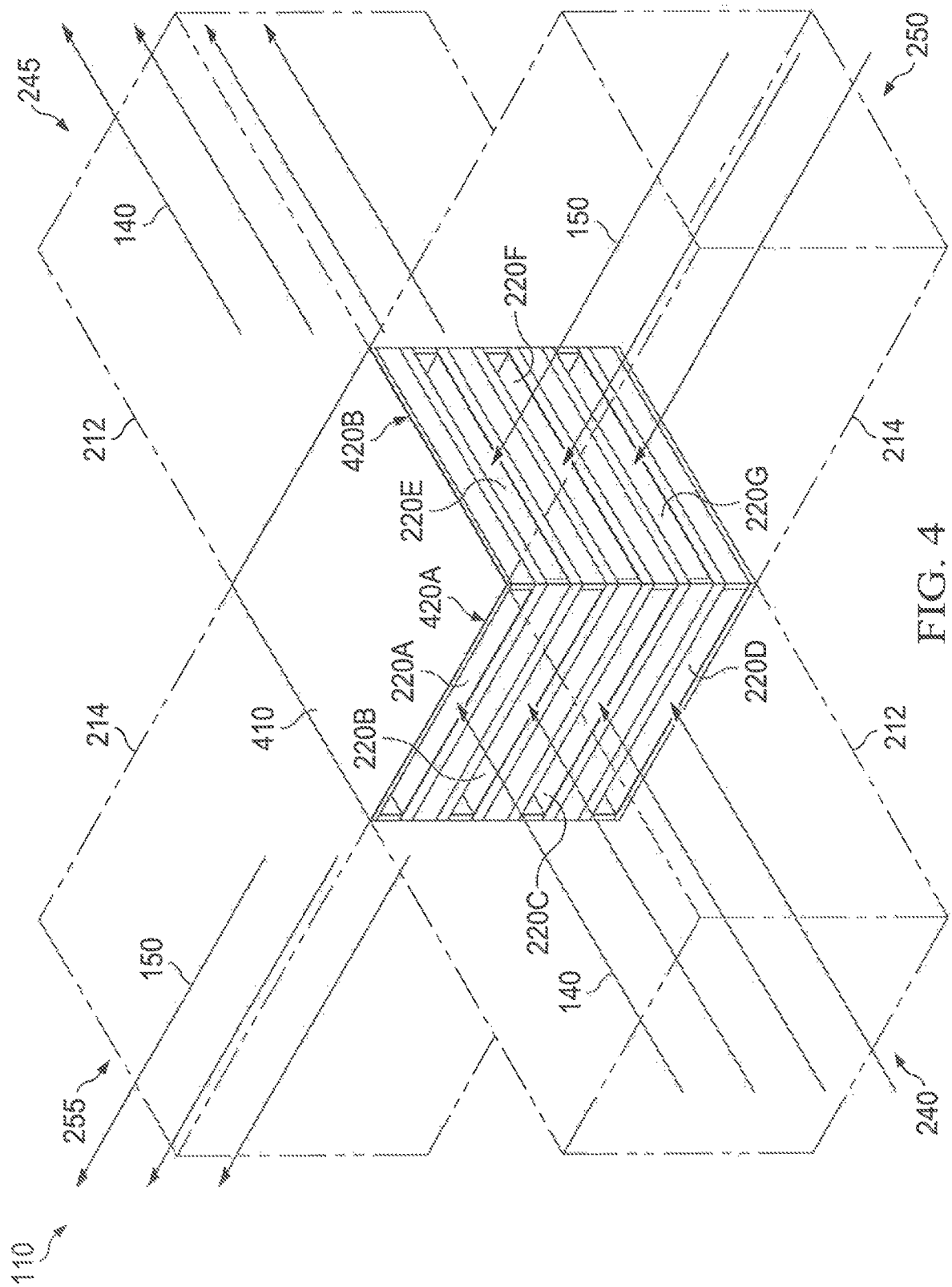
FIG. 4 illustrates an alternate configuration of a latent exchanger that may be utilized by the greenhouse system of FIG. 1, according to certain embodiments.

The advantages and features of certain embodiments are discussed in more detail below in reference to FIGS. 1-4. FIG. 1 illustrates a greenhouse system, FIG. 2 illustrates a latent exchanger that may be utilized by the greenhouse system of FIG. 1, FIG. 3 illustrates an alternate installation of the latent exchanger of FIG. 2, and FIG. 4 illustrates an alternate configuration of the latent exchanger of FIG. 2, according to certain embodiments.

FIG. 1 illustrates a greenhouse system 100, according to certain embodiments. As illustrated in FIG. 1, greenhouse system 100 may include a greenhouse 120 and a latent exchanger 110. Latent exchanger 110 may be physically connected to greenhouse 120 via one or more ducts 130. Ducts 130 may be used to circulate greenhouse airflow 140 through latent exchanger 110 and back into greenhouse 120.

In general, latent exchanger 110 enables the transfer of heat and moisture from greenhouse 120 to outside environment 160 without ventilating valuable carbon dioxide to the outside environment. As greenhouse airflow 140 flows through one portion of latent exchanger 110 (e.g., greenhouse air chamber 212 described below), an outside airflow 150 is made to flow through a separate portion of latent exchanger 110 (e.g., outside air chamber 214 described below). The two portions of latent exchanger 110 are separated by a membrane (e.g., membrane 220) that permits moisture and heat to be transferred from greenhouse airflow 140 to outside airflow 150 while preventing gasses such as carbon dioxide from escaping from greenhouse airflow 140 into outside airflow 150. This allows greenhouse 120 to remain sealed in order to maintain high levels of carbon dioxide while still permitting heat and moisture to be evacuated to outside environment 160. As a result, the operation of greenhouse 120 may be more cost and energy efficient while the yield of greenhouse 120 may be increased.

Greenhouse 120 is any enclosure that is used to grow plants. In general, greenhouse 120 is used to maintain certain environmental conditions to support plant growth. For example, the temperature, humidity, and levels of carbon dioxide within greenhouse 120 may be maintained to certain levels to provide essential conditions to support plant growth. In some embodiments, greenhouse 120 may be unventilated to outside environment 160. For example, some existing greenhouses utilize one or more exhaust fans to ventilate excess heat and moisture from the greenhouse to outside environment 160. Greenhouse 120, however, may be devoid of such systems to avoid venting valuable carbon dioxide to outside environment 160. As described in more detail below, greenhouse 120 may utilize latent exchanger 110 to remove unwanted moisture and heat from greenhouse 120 to outside environment 160.

While some embodiments have been described as being utilized by greenhouse 120, the disclosed embodiments may be utilized in any situation where indoor conditions are wetter (higher dew points) than outside conditions (lower dew point). As one example, the disclosed embodiments may be used by an indoor swimming pool to reduce temperatures and humidity levels of the indoor swimming pool. The disclosed embodiments are not limited to being used only with greenhouses such as greenhouse 120.

FIG. 2 illustrates a latent exchanger 210 that may be utilized as latent exchanger 110 of greenhouse system 100, according to certain embodiments. In some embodiments, latent exchanger 210 includes a greenhouse air chamber 212, an outside air chamber 214, and a membrane 220 that separates greenhouse air chamber 212 from outside air chamber 214. In general, chambers 212 and 214 are any sized and shaped spaces within latent exchanger 210 that permit flows of air to enter an exit latent exchanger 210. For example, greenhouse air chamber 212 is any space within latent exchanger 210 through which greenhouse airflow 140 may flow, and outside air chamber 214 is any space within latent exchanger 210 through which outside airflow 150 may flow. Greenhouse air chamber 212 includes a greenhouse air inlet 240 and a greenhouse air outlet 245 that permits greenhouse airflow 140 to enter and exit greenhouse air chamber 212, respectively. Likewise, outside air chamber 214 includes an outside air inlet 250 and an outside air outlet 255 that permits outside airflow 150 to enter and exit outside air chamber 214, respectively. Inlets 240, 250 and outlets 245, 255 may be any appropriate shape or size and may be in any location on latent exchanger air diffuser 210.

In some embodiments, latent exchanger 210 is generally rectangular in shape. In other embodiments, latent exchanger 210 may have any other appropriate shape or size. In some embodiments, latent exchanger 210 is formed from metal (e.g., aluminum), but may be made of any other appropriate material (e.g., plastic and the like).

Membrane 220 is any appropriate gas-impervious (or semi gas-impervious) material of any appropriate thickness that prevents greenhouse airflow 140 from mixing with outside airflow 150 but allows moisture and heat to be transferred from greenhouse airflow 140 to outside airflow 150 through membrane 220. For example, membrane 220 may be partially or fully impervious to carbon dioxide but permit a moisture flow 225 from greenhouse airflow 140 to outside airflow 150 through membrane 220. In some embodiments, membrane 220 is a polymer or any other gas-impervious (either fully or semi-impervious) plastic. In some embodiments, membrane 220 is a Mustang Crossflow ERV by dPoint. In some embodiments, membrane 220 is a fiber ceramic membrane.

In some embodiments, latent exchanger 210 includes fans 230A-B to enable airflows 140 and 150 through latent exchanger 210. For example, fan 230A may provide greenhouse airflow 140 through greenhouse air chamber 212 and fan 230B may provide outside airflow 150 through outside air chamber 214. Fans 230 may be any type of air mover (e.g., axial fan, forward inclined impeller, backward inclined impeller, etc.) that is configured to generate greenhouse airflow 140 and outside airflow 150 through latent exchanger 210. In some embodiments, fans 230 are variable-speed fans.

In some embodiments, fans 230 may be automatically enabled/disabled based on conditions within greenhouse 120. For example, when the humidity within greenhouse 120 reaches or exceeds a predetermined amount (e.g., 70-80% relative humidity as detected by a humidistat within greenhouse 120 or latent exchanger 210), fans 230 may be enabled to generate greenhouse airflow 140 and outside airflow 150 in order to transfer moisture out of greenhouse 120 to outside environment 160. When the humidity within greenhouse 120 is below the predetermined amount, fans 230 may be disabled to conserve energy. As another example, when the temperature within greenhouse 120 reaches or exceeds a predetermined amount (e.g., 100 degrees F. as detected by a thermostat within greenhouse 120 or latent exchanger 210), fans 230 may be enabled to generate greenhouse airflow 140 and outside airflow 150 in order to transfer heat out of greenhouse 120 to outside environment 160. When the temperature within greenhouse 120 is below the predetermined amount, fans 230 may be disabled to conserve energy. Fans 230 may also be disabled (or their fan speeds may be changed) depending upon outside temperatures (i.e., the temperature of outside environment 160) to prevent frost building up on surfaces of membrane 220. In some embodiments, supplemental heat may also be added to outside airflow 150 to prevent frost build up.

Fans 230 may be located in any appropriate location within latent exchanger 210. In some embodiments, fans 230 may be located proximate to inlets 240 and 250 either inside or outside of latent exchanger 210. In other embodiments, fans 230 may be located proximate to outlets 245 and 255 either inside or outside of latent exchanger 210. In some embodiments, fans 230 may not be included within or coupled to latent exchanger 210 at all. For example, fan 230A may be located within greenhouse 120 or within one of ducts 130. Furthermore, fans 230 may be configured to generate airflows 140 and 150 in any appropriate direction. For example, while FIG. 2 illustrates greenhouse airflow 140 flowing in an opposite direction from outside airflow 150, other embodiments may be configured to provide airflows 140 and 150 in the same direction.

In operation, latent exchanger 210 enables the transfer of heat and moisture out of greenhouse 120 while preventing valuable gasses such as carbon dioxide from being ventilated from greenhouse 120. Typically, greenhouses utilize systems such as exhaust fans to ventilate unwanted moisture and heat to outside environment 160. However, systems that utilize exhaust fans also ventilate valuable carbon dioxide out of the greenhouse, which is usually expensive to generate (e.g., using carbon dioxide tanks or gas flames). To address these and other problems with ventilating systems such as exhaust fans, latent exchanger 210 transfers heat and moisture from an airflow with a higher moisture level (e.g., greenhouse airflow 140) to an airflow with a lower moisture level (e.g., outside airflow 150). More specifically, when the moisture or temperature level within greenhouse 120 meets or exceeds a predetermined amount, fans 230 may be enabled to generate greenhouse airflow 140 and outside airflow 150. Greenhouse airflow 140 flows out of greenhouse 120, through greenhouse air inlet 240, and into greenhouse air chamber 212. Outside airflow 150 flow from outside environment 160, through outside air inlet 250, and into outside air chamber 214. While in greenhouse air chamber 212, moisture and heat may pass from greenhouse airflow 140, through membrane 220, and into outside airflow 150 (e.g., via flow 225). However, membrane 220 is fully or semi gas-impervious and prevents most or all gasses such as carbon dioxide from passing from greenhouse airflow 140 to outside airflow 150. This removes moisture and heat from greenhouse airflow 140 and deposits it into outside airflow 150 but prevents the loss of carbon dioxide from greenhouse 120. The dryer and cooler greenhouse airflow 140 may then flow out of greenhouse air chamber 212 via greenhouse air outlet 245 and back into greenhouse 120. The wetter and hotter outside airflow 150 may then flow out of outside air chamber 214 and back into outside environment 160.

Latent exchanger 210 provides many advantages over existing systems used to ventilate moisture from areas such as greenhouse 120. As one example, latent exchanger 210 may be used to remove moisture from greenhouse 120 using minimal energy. Fans 230 may be enabled/disabled based on conditions within greenhouse 120 and may be operated at a lower/variable speed to conserve energy. As another example, latent exchanger 210 allows greenhouse 120 to remain non-ventilated, which allows high/optimal carbon dioxide levels to be maintained within greenhouse 120. This increases yield while remaining cost-efficient.

FIG. 3 illustrates an alternate installation of latent exchanger 210 with greenhouse 120, according to certain embodiments. Unlike latent exchanger 110 of FIG. 1 where ducts 130 are used to channel greenhouse airflow 140 into and out of latent exchanger 110, the embodiment of FIG. 3 does not utilize ducts 130. Instead, latent exchanger 210 is installed within a wall of greenhouse 120 as illustrated. In this configuration, greenhouse air inlet 240 and greenhouse air outlet 245 of latent exchanger 210 are within greenhouse 120 while outside air inlet 250 and outside air outlet 255 are outside of greenhouse 120 (i.e., within outside environment 160). This permits greenhouse airflow 140 and outside airflow 150 to flow directly into and out of latent exchanger 210, thereby decreasing installation and maintenance costs of latent exchanger air diffuser 210. While latent exchanger 210 is depicted in FIG. 3 in a certain position within a wall of greenhouse 120, latent exchanger 210 may be in any other appropriate location on a wall of greenhouse 120.

In some embodiments, latent exchanger 210 may be located completely inside greenhouse 120. In such an embodiment, one or more ducts 130 may be used to transport outside airflow 150 to/from latent exchanger 210 and greenhouse 120. For example, ducts 130 may be coupled to outside air inlet 250 and outside air outlet 255 in order to transport outside airflow 150 between latent exchanger 210 and greenhouse 120.

FIG. 4 illustrates an alternate configuration of latent exchanger 110, according to certain embodiments. This figure illustrates how some embodiments of latent exchanger 110 may include a core 410 with multiple membranes 220 (e.g., membranes 220A-G) that divide portions of greenhouse air chamber 212 and outside air chamber 214 into stacked, alternating partitions and create air paths (e.g., cross-flow or counter-flow air paths) for greenhouse airflow 140 and outside airflow 150 that prevent greenhouse airflow 140 and outside airflow 150 from mixing. In the illustrated embodiment, greenhouse airflow 140 flows into a first face 420A of core 410 and into channels above membranes 220A-D, while outside airflow 150 flows into a second face 420B of core 410 and into channels above membranes 220E-G. This increases the amount of surface area of membranes 220 and thereby increases moisture flow 225 between greenhouse airflow 140 and outside airflow 150. While FIG. 4 illustrates latent exchanger 110 that includes seven membranes 220, other embodiments may include any appropriate number of membranes 220 (e.g., 20-40 membranes 220 or more as needed). Furthermore, other embodiments may include other arrangements of membranes 220 such as an arrangement that causes counter-flow air paths for greenhouse airflow 140 and outside airflow 150.

Although a particular implementation of latent exchanger 110 is illustrated and primarily described, the present disclosure contemplates any suitable implementation of latent exchanger 110 according to particular needs. Moreover, although various components of latent exchanger 110 have been depicted as being located at particular positions, the present disclosure contemplates those components being positioned at any suitable location, according to particular needs.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
   a latent exchanger comprising:
      a first chamber comprising a first inlet and a first outlet;
      a second chamber comprising a second inlet and a second outlet;
      one or more membranes separating the first chamber from the second chamber, the one or more membranes being gas-impervious;
   a first fan configured to generate a greenhouse airflow that flows from a greenhouse, through the first inlet into the first chamber, out of the first outlet of the first chamber, and then back to the greenhouse; and
   a second fan configured to generate an outside airflow that flows from an outside environment, through the second inlet into the second chamber, out of the second outlet of the second chamber, and then back to the outside environment;
   wherein the one or more membranes are configured to:
      permit moisture to flow through the one or more membranes from the greenhouse airflow to the outside airflow through the membrane; and
      prevent carbon dioxide from flowing through the one or more membranes from the greenhouse airflow to the outside airflow.

2. The system of claim 1, wherein:
   the latent exchanger is coupled to the greenhouse using one or more ducts; and
   the greenhouse airflow flows into the latent exchanger via the one or more ducts.

3. The system of claim 1, wherein the latent exchanger is coupled to a wall of the greenhouse.

4. The system of claim 3, wherein the greenhouse airflow flows directly into the latent exchanger from the greenhouse in the absence of any ducts.

5. The system of claim 1, further comprising one or more sensors located within the greenhouse, the one or more sensors operable to enable and disable the first and second fans.

6. The system of claim 5, wherein the one or more sensors comprise a humidistat or a thermostat.

7. The system of claim 1, wherein the one or more membranes comprise a polymer.

8. A system, comprising:
   an exchanger comprising:
      a first chamber comprising a first inlet and a first outlet;
      a second chamber comprising a second inlet and a second outlet;
      one or more membranes separating the first chamber from the second chamber;
   a first fan configured to generate a first airflow that flows from an un-ventilated enclosure, through the first inlet into the first chamber, out of the first outlet of the first chamber, and then back to the un-ventilated enclosure; and
   a second fan configured to generate an outside airflow that flows from an outside environment, through the second inlet into the second chamber, out of the second outlet of the second chamber, and then back to the outside environment;
   wherein the one or more membranes are configured to:
      permit moisture to flow through the one or more membranes from the first airflow to the outside airflow; and
      prevent carbon dioxide from flowing through the one or more membranes from the first airflow to the outside airflow.

9. The system of claim 8, wherein:
   the exchanger is coupled to the un-ventilated enclosure using one or more ducts; and
   the first airflow flows into the exchanger via the one or more ducts.

10. The system of claim 8, wherein the exchanger is coupled to a wall of the un-ventilated enclosure.

11. The system of claim 10, wherein the first airflow flows directly into the exchanger from the un-ventilated enclosure in the absence of any ducts.

12. The system of claim 8, further comprising one or more sensors located within the un-ventilated enclosure, the one or more sensors operable to enable and disable the first and second fans.

13. The system of claim 12, wherein the one or more sensors comprise a humidistat or a thermostat.

14. The system of claim 8, wherein the one or more membranes comprise a polymer.

* * * * *